United States Patent [19]

Kobayashi et al.

[11] Patent Number: 6,100,367

[45] Date of Patent: Aug. 8, 2000

[54] COATING AGENT, METHOD OF PREPARING SAME, AND COATING MATERIAL

[75] Inventors: Hideki Kobayashi; Toru Masatomi, both of Chiba Prefecture, Japan

[73] Assignee: Dow Corning Toray Silicone Co., Ltd., Tokyo, Japan

[21] Appl. No.: 09/276,512

[22] Filed: Mar. 25, 1999

[30] Foreign Application Priority Data

Mar. 30, 1998 [JP] Japan .................................. 10-102020

[51] Int. Cl.$^7$ ...................................................... C08G 63/00
[52] U.S. Cl. .............................................................. 528/196
[58] Field of Search .............................................. 528/196

[56] References Cited

FOREIGN PATENT DOCUMENTS 58-109062  6/1983  Japan .

*Primary Examiner*—Terressa M. Boykin
*Attorney, Agent, or Firm*—Larry A. Milco

[57] ABSTRACT

A method of preparing a coating agent, the method comprising the steps of (I) reacting (A) a polymer having at least two organic groups containing carbon-carbon unsaturated bonds with (B) an alkoxysilane containing a silicon-bonded hydrogen atom in an organic solvent and in the presence of a hydrosilylation catalyst to produce a solution containing an alkoxysilyl-functional polymer, wherein component (A) has a number-average molecular weight of 500 to 100,000 and has a principal chain comprise a polycarbonate or a polyallylate; and the alkoxysilane is an alkoxysilane having the formula $H\!-\!SiR^3_{3-a}(OR^4)_a$ or a partial hydrolyzate thereof, wherein $R^3$ is a monovalent hydrocarbon group having 1 to 10 carbon atoms, $R^4$ is a monovalent hydrocarbon group having 1 to 8 carbon atoms, and a is from 1 to 3; (II) adding an adsorbing agent to the solution; wherein the absorbing agent is selected from the group consisting of active carbon, silica, silica gel, glass beads, and silane-treated absorbing agents formed therefrom to form a mixture; and (III) separating the absorbing agent from the mixture to produce a coating agent containing not more than 1 part per million of the hydrosilylation catalyst. A coating agent prepared by the aforementioned method and a coating material formed by applying the coating agent to a substrate.

22 Claims, No Drawings

COATING AGENT, METHOD OF PREPARING SAME, AND COATING MATERIAL

FIELD OF THE INVENTION

The present invention relates to a method of preparing a coating agent, and more particularly to a method of preparing a coating agent comprising an alkoxysilyl-functional polymer and an organic solvent. The present invention also relates to such coating agent and to a coating material formed by applying the coating agent to a substrate.

BACKGROUND OF THE INVENTION

Polycarbonates and polyarylates are known as coating agents, and are widely used in optical applications, etc. Furthermore, a medical material containing a polycarbonate with cross-linkable silyl groups as an active ingredient has been disclosed (see Japanese Patent Application Kokai No. 58-109062). However, polycarbonates which have such cross-linkable silyl groups suffer from the drawback of being colored a light yellow color, and have therefore conventionally been unsuitable for use as optical coating agents.

SUMMARY OF THE INVENTION

The present inventors conducted research in order to solve the above-mentioned problems. Specifically, the present invention is directed to a method of preparing a coating agent, the method comprising the steps of:

(I) reacting (A) a polymer having at least two organic groups containing carbon-carbon unsaturated bonds with (B) an alkoxysilane containing a silicon-bonded hydrogen atom in an organic solvent and in the presence of a hydrosilylation catalyst to produce a solution containing an alkoxysilyl-functional polymer, wherein component (A) has a number-average molecular weight of 500 to 100,000 and has a principal chain comprising a polycarbonate or a polyarylate; and the alkoxysilane is an alkoxysilane having the formula:

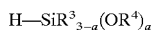

or a partial hydrolyzate thereof, wherein $R^3$ is a monovalent hydrocarbon group having 1 to 10 carbon atoms, $R^4$ is a monovalent hydrocarbon group having 1 to 8 carbon atoms, and a is from 1 to 3;

(II) adding an adsorbing agent to the solution; wherein the absorbing agent is selected from the group consisting of active carbon, silica, silica gel, glass beads, and silane-treated absorbing agents formed therefrom to form a mixture; and (III) separating the absorbing agent from the mixture to produce a coating agent containing not more than 1 part per million of the hydrosilylation catalyst.

The present invention is also directed to a coating agent prepared by the aforementioned method.

The instant invention is further directed to a coating material formed by applying the aforementioned coating agent to a substrate.

DETAILED DESCRIPTION OF THE INVENTION

The first step of the present method of preparing a coating agent comprises reacting (A) a polymer having at least two organic groups containing carbon-carbon unsaturated bonds with (B) an alkoxysilane containing a silicon-bonded hydrogen atom in an organic solvent and in the presence of a hydrosilylation catalyst to produce a solution containing an alkoxysilyl-functional polymer, wherein component (A) has a number-average molecular weight of 500 to 100,000 and has a principal chain comprising a polycarbonate or a polyarylate; and the alkoxysilane is an alkoxysilane having the formula:

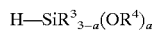

or a partial hydrolyzate thereof, wherein $R^3$ is a monovalent hydrocarbon group having 1 to 10 carbon atoms, $R^4$ is a monovalent hydrocarbon group having 1 to 8 carbon atoms, and is from 1 to 3.

Component (A) of the present invention is a polymer having at least two organic groups containing carbon-carbon unsaturated bonds. Component (A) also has a number average molecular weight of from 500 to 100,000 and has a principal chain comprising a polycarbonate or a polyarylate.

As stated above, the principal chain of component (A) can comprise a polycarbonate. The constituent units of the polycarbonate include constituent units having the formula:

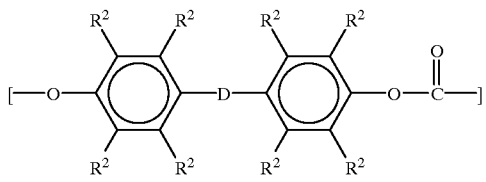

wherein $R^2$ is selected from the group consisting of hydrogen atoms, halogen atoms and monovalent hydrocarbon groups having 1 to 4 carbon atoms and D is selected from the group consisting of divalent hydrocarbon groups, —O—, —S—, —CO— and —SO$_2$—. Examples of monovalent hydrocarbon groups which can be used include, alkyl such as methyl, ethyl, propyl, butyl, etc.; and alkenyl such as vinyl, allyl, etc. Examples of divalent hydrocarbon groups which can be used include, alkylidene, aryl-substituted alkylidene, alkylene, cycloalkylene, arylene, and groups formed by bonding of any of the preceding groups. The structure of the alkylidene group may be linear, branched or cyclic.

Polycarbonates having the aforementioned structure can be prepared by reacting phosgene, a carbonic acid diester or a polycarbonate oligomer with a dihydric phenol compound having the formula:

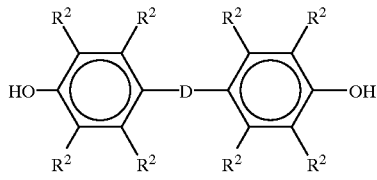

wherein $R^2$ and D are the same as described above.

Examples of such dihydric phenol compounds include bis(4-hydroxyphenyl)methane, bis(4-hydroxyphenyl) ether, bis(4-hydroxyphenyl)sulfone, bis(4-hydroxyphenyl) sulfoxide, bis(4-hydroxyphenyl)sulfide, bis(4-hydroxyphenyl) ketone, 1,1-bis(4-hydroxyphenyl)ethane, 2,2-bis(4-hydroxyphenyl)propane, 2,2-bis(4-hydroxyphenyl)hexafluoropropane, 2,2-bis(4-hydroxyphenyl)butane, 1,1- bis(4-hydroxyphenyl) cyclohexane, 2,2-bis(4-hydroxy-3,5-dibromophenyl)

propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3,5-diemthylphenyl)propane, 1,1 -bis(4-hydroxyphenyl)-1-phenylethane and bis(4-hydroxyphenyl)diphenylmethane. Among these, 2,2-bis(4-hydroxyphenyl)propane and 1,1-bis(4-hydroxyphenyl)cyclohexane are especially desirable.

Also, as stated above, the principal chain of component (A) can comprise a polyarylate. The constituent units of the polyarylate include constituent units having the formula:

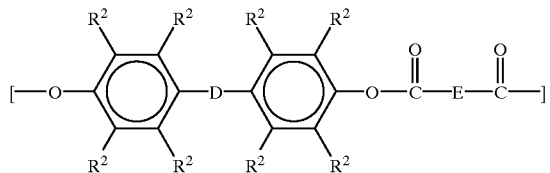

wherein $R^2$ and D are as described above, E is a substituted or unsubstituted divalent hydrocarbon group having 1 to 20 carbon atoms, provided at least 50 mole % of the E groups are aromatic hydrocarbon groups. Examples of aromatic hydrocarbon groups which can be used include ortho-phenylene, meta-phenylene, para-phenylene, naphthylene, and diphenylenealkane. Furthermore, examples of divalent hydrocarbon groups other than aromatic hydrocarbon groups which can be used include alkylene, cycloalkylene, and halogen-substituted groups of these types.

Polyarylate having the aforementioned structure can be manufactured by carrying out a polycondensation reaction of the aforementioned dihydric phenol compound with an aromatic dicarboxylic acid. Reaction methods which can be used include ordinary melt polymerization methods, interfacial polymerization methods and solution polymerization methods, etc.

As indicated above, component (A) contains at least two organic groups containing carbon-carbon unsaturated bonds. Examples of groups containing carbon-carbon unsaturated bonds include alkenyl such as vinyl, allyl, 5-hexenyl, etc., the corresponding alkenyloxy groups, alkynyl groups such as ethynyl, etc., and the corresponding alkynyloxy groups. Such groups containing carbon-carbon unsaturated bonds may be located on the side chain, terminals, or both; there are no restrictions on the bonding positions with respect to the principal chains. For example, the groups containing carbon-carbon unsaturation can be $R^2$ or can be present within D or E in the aforementioned polycarbonate or polyarylate. Polymers prepared by polymerizing 2,2-bis(2-allyl-4-hydroxyphenyl)propane or 2,2-bis(3-allyl-4-hydroxyphenyl)propane are preferred.

Component (B) of the present invention is an alkoxysilane containing a silicon-bonded hydrogen. Component (B) is an alkoxysilane having the formula:

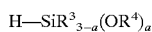

or a partial hydrolyzate thereof, wherein $R^3$ is a monovalent hydrocarbon group having 1 to 10 carbon atoms, $R^4$ is a monovalent hydrocarbon group having 1 to 8 carbon atoms, and a is from 1 to 3.

Examples of substituted or unsubstituted monovalent hydrocarbon group represented by $R^3$ include alkyl such as methyl, ethyl, propyl, butyl, pentyl, hexyl, heptyl, octyl, nonyl, decyl, etc.; aryl such as phenyl, tolyl, xylyl, etc.; aralkyl such as benzyl, phenethyl, etc.; and halogenated alkyl such as 3,3,3-trifluoropropyl, 1 H,1 H,2 H,2 H-nonafluorohexyl, 1 H,1 H,2 H,2 H-perfluorodecyl, etc.

Among these groups, methyl and phenyl are especially desirable. Furthermore, the groups represented by $R^3$ may be the same or different. $R^4$ denotes a substituted or unsubstituted monovalent hydrocarbon group having 1 to 8 carbon atoms. Examples of such groups include alkyl such as methyl, ethyl, propyl, butyl, pentyl, hexyl, octyl, etc.; and aryl such as phenyl, tolyl, xylyl, etc. Among these groups, methyl and ethyl are especially desirable. The alkoxysilane can also be a partial hydrolyzate of the alkoxysilane (i). The later alkoxysilane can be partially hydrolyzed prior to the hydrosilylation reaction.

The amount of this component (B) used is either equimolar or a molar excess with respect to the number of moles of alkenyl groups contained in component (A). In the case of a molar excess, component (B) can be used in an amount up to about 2 times the number of moles of alkenyl groups in component (A).

The organic solvent of the present invention may be any solvent that is capable of dissolving component (A) and component (B). Examples of such organic solvents include chlorinated hydrocarbons such as dichloromethane, 1,2-dichloroethane, 1,1,2,2-tetrachloroethane, chloroform, 1,1,1-trichloroethane, carbon tetrachloride, monochlorobenzene and dichlorobenzene, etc.; aromatic hydrocarbons such as benzene, toluene, xylene and ethylbenzene, etc.; and ether-type compounds such as diethyl ether, etc. These organic solvents may also be used in mixtures consisting of two or more solvents. Preferably, the solvent is used in an amount such that the concentration of component (A) is 5 wt % to 80 wt %.

The hydrosilylation metal catalyst of the present invention can be, for example a platinum-type catalyst, rhodium-type catalyst or palladium-type catalyst. Among these catalysts, platinum type catalysts are especially desirable. Concrete examples of such catalysts include chloroplatinic acid, alcohol solutions of chloroplatinic acid, complexes of platinum with divinyltetramethyldisiloxane, and complexes of platinum with olefins. Furthermore, the platinum type catalysts also include supported platinum catalysts. Suitable examples of such supported platinum catalysts include platinum supported on powdered carbon, platinum supported on finely powdered silica and platinum supported on finely powdered alumina, etc.

Although there are no particular restrictions on the amount of the hydrosilylation metal catalyst used in the present method, typically the amount used is in the range from 1 to 500 parts by weight, based on the metal, per 100 parts by weight of component (A). In supported platinum catalysts the amount of supported platinum is ordinarily in the range from 0.1 to 10 wt %. Supported platinum catalysts are separated by commonly known methods such as filtration or centrifugal separation, etc.

The order in which component (A), component (B), the organic solvent, and the hydrosilylation catalyst are combined in the first step of the present method is not critical. For example, the first step of the present method can be carried out by dissolving component (A) in the organic solvent, adding the hydrosilylation catalyst to the solution, and then adding component (B) dropwise with agitation. Alternatively, the first step can be carried out by dissolving component (A) in the organic solvent, adding component (B) to the solution, and then adding the hydrosilylation catalyst. Still further, the first step of the present method can be carried out by adding a mixture of component (B) and the hydrosilylation catalyst dropwise to a solution prepared by dissolving component (A) in the organic solvent. Following the completion of the hydrosilylation reaction, the unreacted alkoxysilane of component (B) can be removed by heat stripping.

In the first step of the present method of preparing a coating agent, a hydrosilylation reaction occurs between the silicon-bonded hydrogen atoms in the alkoxysilane or partial hydrolyzate of the alkoxysilane, component (B), and the carbon-carbon unsaturated bonds in component (A). The silicon-bonded hydrogen atoms selectively add to the groups containing carbon-carbon unsaturated, thereby introducing alkoxysilyl groups into the polymer of component (A). Also, almost no hydrosilylation occurs between component (B) and the carbonyl groups in the polycarbonate or polyarylate in the principal chain of component (A).

In the second step of the present method of preparing a coating agent, an adsorbing agent is added to the solution of the alkoxysilyl-functional polymer. The absorbing agent is selected from the group consisting of active carbon, silica, silica gel, glass beads, and silane-treated absorbing agents formed therefrom. Preferably, the adsorbing agent has a specific surface area in the range from 10 to 1000 $m^2/g$.

The adsorbing agent of the present invention is preferably a silane-treated adsorbing agent, prepared by treating active carbon, silica, silica gel, or glass beads with a silane treating agent. Particularly preferred silane treating agents include aminosilane coupling agents such as 3-aminopropyltriethoxysilane, 3-aminopropyltrimethoxysilane, 3-aminopropylmethyldiethoxysilane, 3-aminopropylmethyldimethoxysilane, γ-(2-aminoethyl) aminopropyltrimethoxysilane, γ-(2-aminoethyl) aminopropylmethyldimethoxysilane, γ-anilinopropyltrimethoxysilane, and mercaptosilane coupling agents such as γ-mercaptopropyltrimethoxysilane and γ-mercaptopropylmethyldimethoxysilane, etc.

Such adsorbing agents are added to the solution following the hydrosilylation reaction. There are no particular restrictions on the amount of adsorbing agent added, as long as the amount added is sufficient to reduce the concentration of the hydrosilylation catalyst to less than or equal to 1 ppm by weight. Ordinarily, however, it is desirable that the amount of adsorbent used is in the range of 1 to 100 parts by weight per 100 parts by weight of component (A). The adsorbing agent is added to the solution following the hydrosilylation reaction, and mixed with the solution for several minutes to several days, preferably several hours. The mixture temperature may be room temperature; alternatively, the mixture may be heated to any temperature up to the boiling point of the solvent.

In the third step of the present method of preparing a coating agent, the adsorbing agent is separated from the mixture (step II). Separation is achieved using a commonly known method such as filtration or centrifugal separation, etc.

In the coating agent, the amount of hydrosilylation reaction metal catalyst is 1 ppm by weight or less. The amount of residual hydrosilylation reaction metal catalyst can easily be measured by a method such as atomic absorption spectroscopy, etc. Furthermore, this polymer solution does not show any coloring such as a light yellow coloring. As a result, a film formed from this polymer solution is especially useful as an optical material.

A uniform, homogeneous coating material can be formed by casting the coating agent of the present invention on various surfaces and allowing the solvent to evaporate. Solvent removal can be accelerated by heating. Furthermore, a coating material with a structure in which the alkoxysilyl groups are cross-linked can be formed by, for example, allowing the coating film to stand for several days at room temperature, or heating the coating film to a temperature of 120° C. or less for several minutes to several hours. Furthermore, since alkoxysilyl groups are cross-lined to each other in this coating film, the film is superior in terms of adhesion, water-repellent characteristics, solvent resistance and mechanical characteristics.

EXAMPLES

Below, the present invention will be described in greater detail in the following examples. In the working example, Me indicates a methyl group.

Example 1

20 grams of a polycarbonate copolymer of bisphenol A and a diallylbisphenol (10:2 molar ratio of monomers) having a number-average molecular weight of 10,000, wherein the diallylbisphenol has the formula:

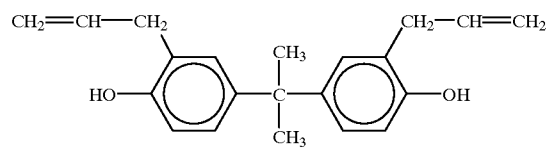

was placed in a reaction vessel and was dissolved in 100 g of chlorobenzene. A complex consisting of chloroplatinic acid and divinyltetramethyldisiloxane was added to this solution in an amount such that the amount of platinum metal was 30 ppm by weight. Next, 30.0 g of methyldimethoxysilane $\{MeSiH(OMe)_2\}$ was added dropwise under agitation. Following the completion of this dropwise agitation, a hydrosilylation reaction was performed by mixing the system for 1 hour at 60° C. Furthermore, the system was heated to 100° C. so that the excess methyldimethoxysilane was distilled away, thus producing a chlorobenzene solution of a polycarbonate onto which methyldimethoxysilyl groups had been introduced. The mole ratio of the units B1 to B2 was 10:2.

B1 units:

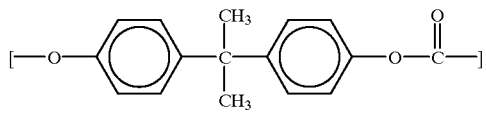

B2 units:

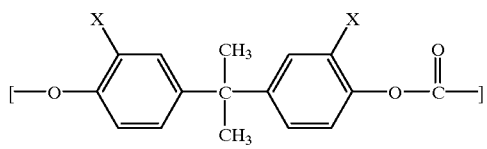

where X is $—CH_2CH_2CH_2SiMe(OMe)_2$.

The platinum metal content of this chlorobenzene solution was 28 ppm by weight, as determined by atomic absorption spectroscopy. This solution and an adsorbing agent prepared by dispersing 10 g of silica gel surface-treated with γ-(2-aminoethyl)aminopropyltrimethoxysilane (specific surface area: 490 $m^2/g$, weight ratio of γ-(2-aminoethyl) aminopropyltrimethoxysilane: silica gel=1:5) in 400 g of chlorobenzene were placed in a 1-liter flask and mixed for 1 hour at 60° C. Following cooling, the adsorbing agent was filtered, and the excess organic solvent was then distilled away, thus producing 100 g of a 20 wt % chlorobenzene solution of a polycarbonate onto which methyldimethoxysilyl groups had been introduced. The platinum metal content of this solution was 0.5 ppm by weight, as determined by atomic absorption spectroscopy.

When this solution was applied to a glass slide using a spin coater, and the organic solvent was removed by heating the slide for 10 minutes at 120° C., a transparent homogeneous coating film was obtained. When the contact angle with respect to water of the coating film thus obtained was measured using a contact angle gauge, the value obtained was 87°. Furthermore, when the pencil hardness of this coating film was measured by the method stipulated in JIS K5400, the value obtained was H. Moreover, the contact angle of an untreated polycarbonate copolymer with respect to water was 80°.

Comparative Example 1

A chlorobenzene solution of the polycarbonate obtained in Example 1 prior to the mixing of the adsorbing agent, having a platinum metal content of 28 ppm, was applied to a glass slide using a spin coater, and the organic solvent was removed by heating the slide for 10 minutes at 120° C. The coating film thus obtained was colored light yellow.

What is claimed is:

1. A method of preparing a coating agent, the method comprising the steps of:
   (I) reacting (A) a polymer having at least two organic groups containing carbon-carbon unsaturated bonds with (B) an alkoxysilane containing a silicon-bonded hydrogen atom in an organic solvent and in the presence of a hydrosilylation catalyst to produce a solution containing an alkoxysilyl-functional polymer, wherein component (A) has a number-average molecular weight of 500 to 100,000 and has a principal chain comprising a polycarbonate or a polyarylate; and the alkoxysilane is an alkoxysilane having the formula:

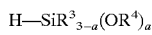

H—SiR$^3_{3-a}$(OR$^4$)$_a$ or a partial hydrolyzate thereof, wherein R$^3$ is a monovalent hydrocarbon group having 1 to 10 carbon atoms, R$^4$ is a monovalent hydrocarbon group having 1 to 8 carbon atoms, and a is from 1 to 3;
   (II) adding an adsorbing agent to the solution; wherein the absorbing agent is selected from the group consisting of active carbon, silica, silica gel, glass beads, and silane-treated absorbing agents formed therefrom to form a mixture; and
   (III) separating the absorbing agent from the mixture to produce a coating agent containing not more than 1 part per million of the hydrosilylation catalyst.

2. The method according to claim 1, wherein the principal chain of component (A) comprises a polycarbonate.

3. The method according to claim 2, wherein the polycarbonate contains constituent units having the formula:

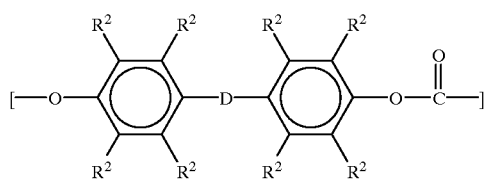

wherein R$^2$ is selected from the group consisting of hydrogen atoms, halogen atoms and monovalent hydrocarbon groups having 1 to 4 carbon atoms and D is selected from the group consisting of divalent hydrocarbon groups, —O—, —S—, —CO— and —SO$_2$—.

4. The method according to claim 3, wherein at least one of R$^2$ and D contains carbon-carbon unsaturated bonds.

5. The method according to claim 3, wherein the polycarbonate is prepared by reacting a compound selected from the group consisting of phosgene, a carbonic acid diester, and a polycarbonate oligomer with a dihydric alcohol having he formula:

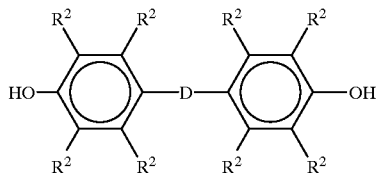

wherein R$^2$ is selected from the group consisting of hydrogen atoms, halogen atoms and monovalent hydrocarbon groups having 1 to 4 carbon atoms and D is selected from the group consisting of divalent hydrocarbon groups, —O—, —S—, —CO— and —SO$_2$—.

6. The method according to claim 5, wherein the dihydric phenol is 2,2-bis(2-allyl-4-hydroxyphenyl)propane or 2,2-bis(3-allyl-4-hydroxyphenyl)propane.

7. The method according to claim 1, wherein the principal chain of component (A) comprises a polyarylate.

8. The method according to claim 7, wherein the polyarylate contains constituent units having the formula:

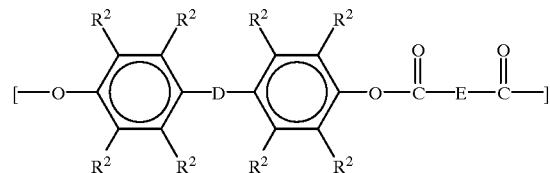

wherein R$^2$ is selected from the group consisting of hydrogen atoms, halogen atoms and monovalent hydrocarbon groups having 1 to 4 carbon atoms, D is selected from the group consisting of divalent hydrocarbon groups, —O—, —S—, —CO— and —SO$_2$—, and E is a substituted or unsubstituted divalent hydrocarbon group having 1 to 20 carbon atoms, provided at least 50 mole % of the E groups are aromatic hydrocarbon groups.

9. The method according to claim 8, wherein at least one of R$^2$, D, and E contains carbon-carbon unsaturated bonds.

10. The method according to claim 8, wherein the polyarylate is prepared by reacting an aromatic dicarboxylic acid with a dihydric alcohol having he formula:

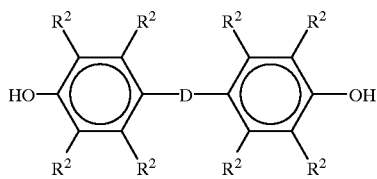

wherein R$^2$ is selected from the group consisting of hydrogen atoms, halogen atoms and monovalent hydrocarbon groups having 1 to 4 carbon atoms and D is selected from the group consisting of divalent hydrocarbon groups, —O—, —S—, —CO— and —SO$_2$—.

11. The method according to claim 10, wherein the dihydric phenol is 2,2-bis(2-allyl-4-hydroxyphenyl)propane or 2,2-bis(3-allyl-4-hydroxyphenyl)propane.

12. The method according to claim 1, wherein $R^3$ in component (B) is methyl or phenyl and $^4$ in component (B) is methyl or ethyl.

13. The method according to claim 1, wherein component (B) is used in at least an equimolar amount with respect to the number of moles of carbon-carbon unsaturated bonds in component (A).

14. The method according to claim 13, wherein component (B) is used in an amount up to about a two-fold molar excess with regard to the number of moles of alkenyl groups in component (A).

15. The method according to claim 1, wherein component (A) is used in an amount from 5 to 80 weight percent, based on the total weight of the solution produced in step I.

16. The method according to claim 1, wherein the hydrosilylation catalyst is a platinum catalyst.

17. The method according to claim 1, wherein the absorbing agent has a specific surface area of from 10 to 1000 m$^2$/g.

18. The method according to claim 1, wherein the absorbing agent is silane-treated absorbing agent.

19. The method according to claim 18, wherein the silane-treated absorbing agent is prepared by treating an absorbing agent selected from the group consisting of active carbon, silica, silica gel, and glass beads with a silane treating gent selected from the group consisting of aminosilanes and mercaptosilanes.

20. The method according to claim 1, wherein the absorbing agent is used in an amount from 1 to 100 parts by weight per 100 parts by weight of component (A).

21. A coating agent prepared by the method according to claim 1.

22. A coating material formed by applying the coating agent according to claim 21 to a substrate.

* * * * *